United States Patent [19]

Reed

[11] 4,132,519
[45] Jan. 2, 1979

[54] CONTROLLED POROSITY OF UNCURED REINFORCED THERMO-SETTING PLASTIC MATERIAL

[75] Inventor: Clyde H. Reed, Riverside, Calif.

[73] Assignee: Rohr Industries, Inc., Chula Vista, Calif.

[21] Appl. No.: 846,457

[22] Filed: Oct. 28, 1977

[51] Int. Cl.² .......................................... B29C 17/10
[52] U.S. Cl. .................................. 425/174.2; 83/171; 83/701; 264/23; 264/156; 425/290
[58] Field of Search ................ 264/154, 155, 23, 156; 83/701, 433, 170, 171, 523; 425/174.2, DIG. 37, 290, 291, 456

[56] References Cited

U.S. PATENT DOCUMENTS

| 3,468,203 | 9/1969 | Armelin et al. | 83/433 |
| 3,719,736 | 3/1973 | Woodruff | 264/156 |

OTHER PUBLICATIONS

West German Offenlegungsschrift 2611931, 9–1977.

*Primary Examiner*—Richard B. Lazarus
*Assistant Examiner*—Mark Rosenbaum
*Attorney, Agent, or Firm*—Patrick J. Schlesinger; Frank D. Gilliam

[57] ABSTRACT

The creation of controlled hole sizes and locations in uncured reinforced thermo setting plastic material by mechanically perforating the uncured material and "B" staging the material surrounding the perforation by sonic vibration of the mechanical perforating device.

2 Claims, 4 Drawing Figures

CONTROLLED POROSITY OF UNCURED REINFORCED THERMO-SETTING PLASTIC MATERIAL

BACKGROUND OF THE INVENTION

The invention generally relates to perforating flat uncured reinforced thermo setting plastic material and more specifically, to "B" staging the material at the opening surface and not effecting the curing of the remaining portions of the material.

U.S. Pat. No. 2,244,550 teaches the use of heated pins to perforate thermo-plastic material by causing the material to melt with pin penetration.

U.S. Pat. No. 3,440,117 teaches the use of sonic energy to cause thermo-plastic to melt for the purpose of embedding a plurality of pins in a thermo-plastic blank.

U.S. Pat. No. 3,719,736 teaches a method of perforating thermo-plastic film with heated pins and provides a reinforced buildup of material around the penetration.

Problems exist in the state of the art for the perforation of this type of material.

When uncured thermo setting plastic type materials are perforated prior to curing so that they can be cured in compound curve shapes or various different shapes other than planner configuration the resin tends to flow due to its viscosity and partially or completely fill the perforation.

When the perforations are made in partially cured or "B" staged thermo-setting material, it has been found that the material tends to fracture when subjected to strain inducing forces when perforated by various methods.

These and other differences were not successfully overcome until the emergence of the instant invention.

SUMMARY OF THE INVENTION

This invention allows for the perforation of uncured thermo-setting material and then "B" stages the uncured material around the lip of the perforations without causing cure of the rest of the material.

It is therefore an object of this invention to provide an apparatus for perforating a sheet of uncured thermo setting reinforced plastic material and cure the perimeter of the perforation to prevent flow of the uncured plastic.

It is another object of the invention to provide perforation through the thermo setting plastic material without fracturing the area adjacent the perforation.

It is another object of the invention to cure the perforations around the perimeter of the uncured thermo setting material without affecting cure of the remaining uncured material.

Further and still other objects of this invention will be more clearly apparent by reference to the following description when taken in conjunction with the accompanying drawings.

DESCRIPTION OF THE PREFERRED EMBODIMENT

Figure 1:
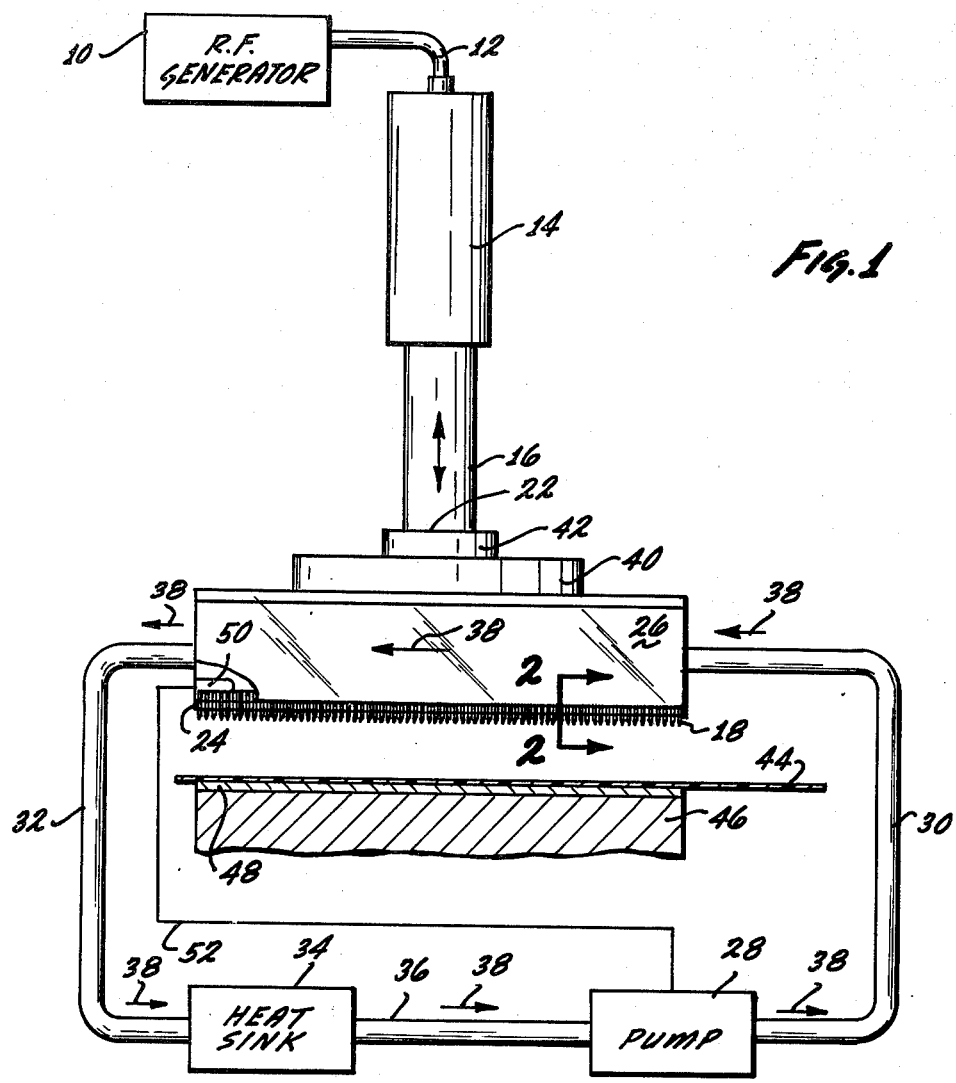
FIG. 1 depicts a side schematic showing partially in a cutaway of the apparatus of the instant invention.

It should be understood that throughout the drawings and specifications the same reference numeral is used to depict the identical part or element.

Referring now to FIG. 1, a side partially cutaway view of the apparatus of the invention is shown. A radio frequency (R.F.) generator 10 provides via conductor 12 alternating current energy at about 20 kilohertz per second to a sonic converter unit 14. The converter is attached to a conical horn 16 for transferring sonic energy to pins 18. The sonic converter 14, generally, is a device which converts electrical energy to mechanical vibrations. The devices are well known in the art. The vibrations are amplified and appear in longitudinal vibrations at the end 22 of the horn 16. The sonic converter may be of any type known in that art providing it has sufficient power for the purpose for which it is utilized to practice this invention.

A plurality of pins 18 are embedded in a base 24 (see FIG. 2), made of any suitable material, such as, but not limited to, steel or aluminum. The chamber 26 above the base plate provides a space for the flow of cooling liquid, such as, tap water, Ethylene Glycol, alcohol or the like for cooling of the pins and base plate.

The cooling solution is circulated by a pump 28 working in a closed system for pumping the cooling fluid to the chamber 26 through conduit 30 and out of the chamber through conduit 32 to a heat sink or radiator 34 and to pump 28 through conduit 36 in the direction of arrows 38, a plate member 40, 42 connectes the end 22 of horn 16 to the chamber supporting the perforating pins 18.

A piece of flat uncured thermo setting reinforced material 44 is positioned on support platform 46. The upper surface of support platform 46 includes a piece of resilient material 48, sponge rubber or the like, to confine the pins 18 when they are in maximum engagement with material 42. Engagement of the material by the pin 18 is accomplished by either moving platform 46 toward base 24 or base 24 toward platform 46 with sufficient force so that the pins penetrate the material 44 completely and at least partially imbed into resilient material 48. An example of engaging means would be a hydraulic arrangement wherein the platform 46 was moved against a stationary base 24, the chamber, including the converter and horn, could be moved toward a stationary platform 46 by similar hydraulic means, or both the chamber and platform could have movement toward each other.

A thermostat 50 is positioned at any suitable location within chamber 26 for monitoring the temperatures of the cooling fluid therein. It is most desirable to locate the thermostat 50 close enough to pins 18 so as to effectively monitor the heat of the pins as well as the fluid temperature. The thermostat is interconnected through line 52 to pump 28 so as to control the operation of the pump for temperature stability of the fluid and pins.

Figure 2:
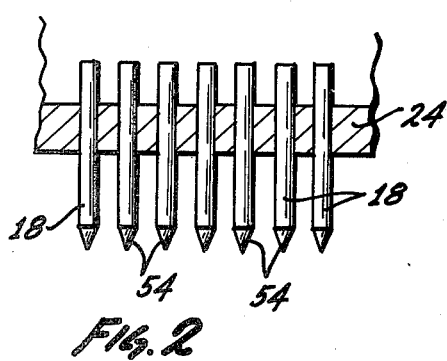
FIG. 2 depicts an enlarged view of the section 2—2 of FIG. 1.
Figure 3:
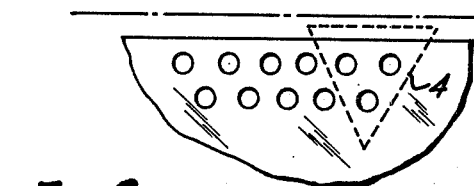
FIG. 3 depicts a portion of the perforated material made by the apparatus of the instant invention.

Referring now specifically to FIG. 2, it can be seen that the tips 54 of the pins 18 are pointed. This enables the pins ease of penetration through material 44 without injury to the material.

OPERATION OF THE PREFERRED EMBODIMENT

Figure 4:
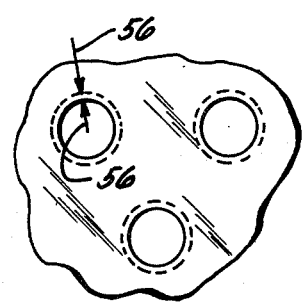
FIG. 4 depicts an enlarged showing of the perforations within the diamond 4 of FIG. 3.

Power is directed to the R.F. generator 10, sonic converter 14, the pump 28 and to the device, not shown, for engaging the pins 18 with the material 44. With the R.F. generator 10 and converter 14 operating, the pins 18 are moved into engagement with the material 44 and continue to move until the tips 54 of the pins 18 engage the resilient material 48. While the pins are engaging and penetrating material 44 and resilient material 48, the pins are vibrating at the sonic frequency of the R.F. generator and generating heat by friction at their point of contact with the uncured material 44. The pins 18 are maintained in contact with the uncured material 44 until sufficient heat is generated to "B" stage or partially cure the uncured material adjacent the pins 18. The area between the arrowheads 56 of FIG. 4 is the desired cure area around the perforation. The temperature and time are critical in that just the surface adjacent the pins is to be cured and the remainder of the material 44 must remain uncured. Obviously, times and temperatures vary with different types and kinds of thermo setting plastics. The thermostat and pump maintain a pre-set desired temperature at the pin area.

After the surfaces of the perforations have been "B" staged the still uncured material 44 can be formed to any desired configuration and eventually completely cured without having the perforations close or be defective in any manner.

When, for example, small pieces of uncured thermo setting material are perforated, a small hand held R.F. generator, converter and pin assembly may be utilized, which would not require the fluid cooling as described above.

While the above described process can be carried out quite suitably at a frequency of 20 kilohertz, per second, sonic energy at any other frequency may be used without materially affecting the results obtained at 20 kilohertz.

Having described the preferred embodiment of the invention, though not exhaustive of all possible equivalents, which is desired to be secured by Letters Patent is distinctly claimed and particularly pointed out in the claims appearing below.

I claim:

1. An apparatus for perforating and partially curing in a selected area a sheet of uncured unperforate thermoplastic material comprising:

a base member;

a plurality of pins carried by said base member;

a platform member having a resilient surface adjacent said base member;

means for providing relative movement of said members between a first position wherein they are spaced apart and a second position wherein said material is positioned between said members, said pins penetrate said material and engage said resilient surface;

sonic means associated with said base member for vibrating said base member during penetration of said material for providing an elevated pin temperature for partially curing said material adjacent to said pin to prevent the uncured plastic material from flowing into and closing the perforations when said pins are withdrawn; and cooling means for maintaining the temperature of said pins at a level just sufficient to partially cure said material adjacent said pins.

2. The invention as defined in claim 1, wherein said cooling means comprises a pump and radiator working in a closed fluid system with a hollow-base member.

* * * * *